(12) United States Patent
Hirko

(10) Patent No.: US 7,128,502 B1
(45) Date of Patent: Oct. 31, 2006

(54) DRILLING GUIDE ASSEMBLY

(76) Inventor: Alexandru Hirko, 4616 N. Wolcott #207, Chicago, IL (US) 60640

( * ) Notice: Subject to any disclaimer, the term of this patent is extended or adjusted under 35 U.S.C. 154(b) by 385 days.

(21) Appl. No.: 10/839,022

(22) Filed: May 6, 2004

(51) Int. Cl.
*B23B 47/28* (2006.01)
(52) U.S. Cl. ............... 408/115 R; 408/241 B
(58) Field of Classification Search .......... 408/97, 408/103, 110, 111, 115 R, 115 B, 241 B
See application file for complete search history.

(56) References Cited

U.S. PATENT DOCUMENTS

| | | | | |
|---|---|---|---|---|
| 22,379 A | * | 12/1858 | Rice | 408/111 |
| 1,072,328 A | * | 9/1913 | Goodrich | 408/115 R |
| 2,953,045 A | * | 9/1960 | Carles | 408/110 |
| 3,086,408 A | * | 4/1963 | Donals | 408/115 R |
| 3,119,286 A | * | 1/1964 | Forman et al. | 408/110 |
| 3,465,620 A | * | 9/1969 | Hilburn | 408/115 R |
| 3,534,639 A | | 10/1970 | Treichler | |
| 3,626,513 A | * | 12/1971 | Pytlak | 408/115 R |
| 3,890,058 A | | 6/1975 | Self et al. | |
| 4,199,283 A | * | 4/1980 | Perry | 408/115 R |
| 4,227,839 A | | 10/1980 | Conway | |
| 4,492,498 A | * | 1/1985 | Kaufman | 408/115 R |
| D291,529 S | * | 8/1987 | Degen | D8/72 |
| 4,793,747 A | * | 12/1988 | Reitz | 408/115 R |
| 4,865,496 A | * | 9/1989 | Challis | 408/115 R |
| 4,923,341 A | | 5/1990 | Cameron | |
| 5,051,044 A | | 9/1991 | Allen | |
| 5,797,708 A | | 8/1998 | Bencic | |

\* cited by examiner

Primary Examiner—Daniel W. Howell

(57) ABSTRACT

A drilling guide assembly for drilling a bore into a pipe includes a first plate and a second plate. Each of a first panel and a second panel has a perimeter edge with a bottom edge and a top edge. The panels are attached to the first and second plates such that the first and second plates are spaced from each other and the panels are aligned. The bottom edges each have a slot therein. A drill bit guide has a lower section and an upper section. The lower section is positioned between the panels and the upper section is positioned on the top edges. An aperture through the drill bit guide and is alignable with a pipe positioned in the slots. A clamp member is attached to the upper section and selectively positions the drill bit guide on the first panel.

7 Claims, 3 Drawing Sheets

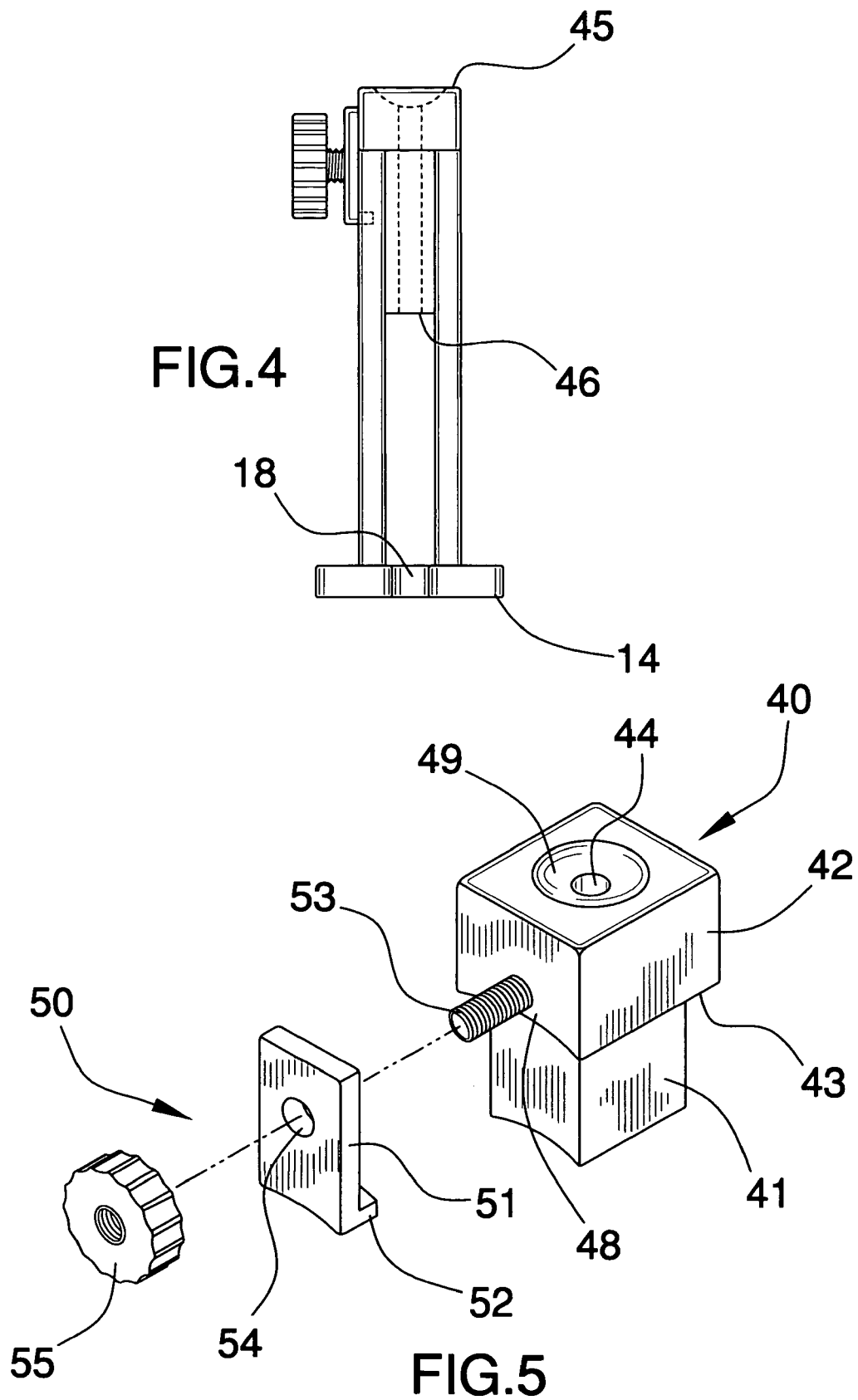

DRILLING GUIDE ASSEMBLY

BACKGROUND OF THE INVENTION

1. Field of the Invention

The present invention relates to drilling guide devices and more particularly pertains to a new drilling guide device for drilling a bore in a pipe so that the bore is aligned with an axis of the pipe.

2. Description of the Prior Art

The use of drilling guide devices is known in the prior art. U.S. Pat. No. 4,227,839 describes a device to be attached to drills for indicating the angle at which the drill is aligned with respect to the surface being drilled. Another type of drilling guide device is U.S. Pat. No. 3,890,058 which is adapted for supporting a drill so that the drill is stationary at a selected angle with respect to a surface to be drilled. Yet another such device is U.S. Pat. No. 5,797,708 that supports a drill at a selected angle with respect to a base in which may be positioned an item to be drilled.

While these devices fulfill their respective, particular objectives and requirements, the need remains for a device that allows a person to drill or bore a hole into a pipe at a selected angle. Additionally, a device is needed that allows a person to drill a hole into a pipe that is curved so that the hole to be drilled is positioned as needed.

SUMMARY OF THE INVENTION

The present invention meets the needs presented above by providing a device having a drill bit guide that will receive the drill bit and direct, at a selected angle, toward a pipe held in a mounting supporting the drill bit guide. The mounting includes a pair of vertical panels that each have slots therein for receiving the pipe. The slots prevent the pipe from moving and keep the axis of the pope aligned with an aperture in the drill bit guide. Because the pipe is held stationary with respect to the drill bit guide, the user of the device may drill a hole into the pipe regardless of the shape or curvature of the pipe along its length. Additionally, since the device does not include a drill integrally coupled thereto, the device is usable with existing power drills and is readily transportable to job sites.

To this end, the present invention generally comprises a first plate and a second plate each having a top side, a bottom side, and a peripheral edge. Each of a first panel and a second panel has a perimeter edge that includes a bottom edge, a top edge, a first side edge and a second side edge. Each of the panels extends into and is attached to each of the first and second plates such that the first and second plates are spaced from each other and each of the first and second panels extends upwardly away from the top sides of the first and second plates. The perimeter edges of the first and second panels are aligned with respect to each other. The bottom edges each have a slot therein positioned between associated ones of the first and second side edges. A drill bit guide has a lower section and an upper section integrally coupled together. The lower section has a width substantially equal to a distance between the first and second panels and the upper section has a width greater than the lower section such that a flange is defined at a juncture of the upper and lower sections. The flange is positioned on the upper edges of the first and second panels such that the lower section is positioned between the first and second panels. The drill bit guide has an aperture extending therethrough. The aperture extends into an upper surface of the upper section and outwardly of a lower surface of the lower section. A clamp member is attached to the upper section and is adapted for attaching the drill bit guide to the first and second panels such that the drill bit guide may be selectively positioned on the upper edges. A pipe may be selectively positioned in the slots such that a drill bit may be removably extended through the aperture and into the pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side view of the present invention.

FIG. 5 is an expanded perspective view of the clamp member of the present invention.

DESCRIPTION OF THE PREFERRED EMBODIMENT

Figure 1:
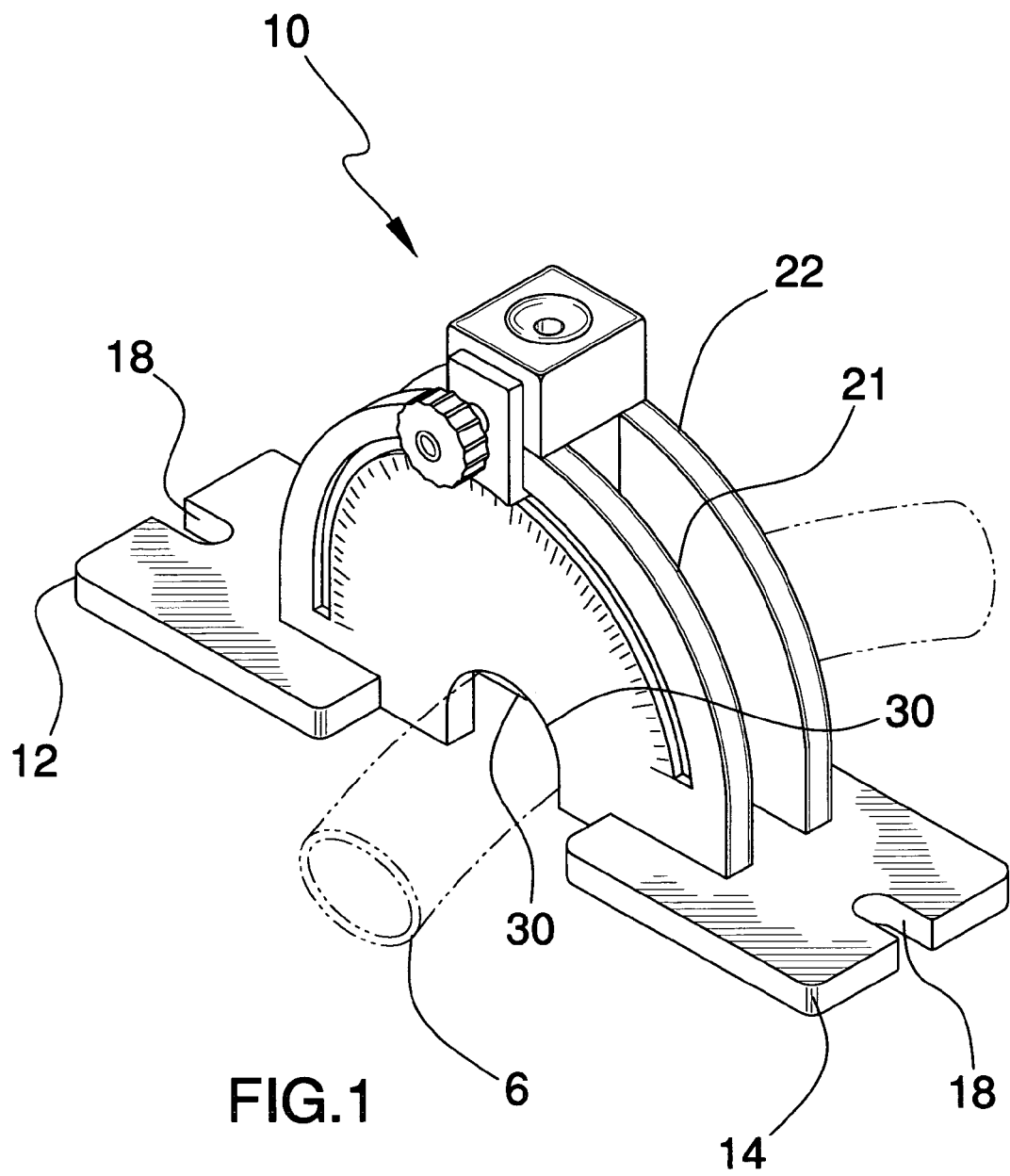
FIG. 1 is a perspective view of a drilling guide assembly according to the present invention.
Figure 2:
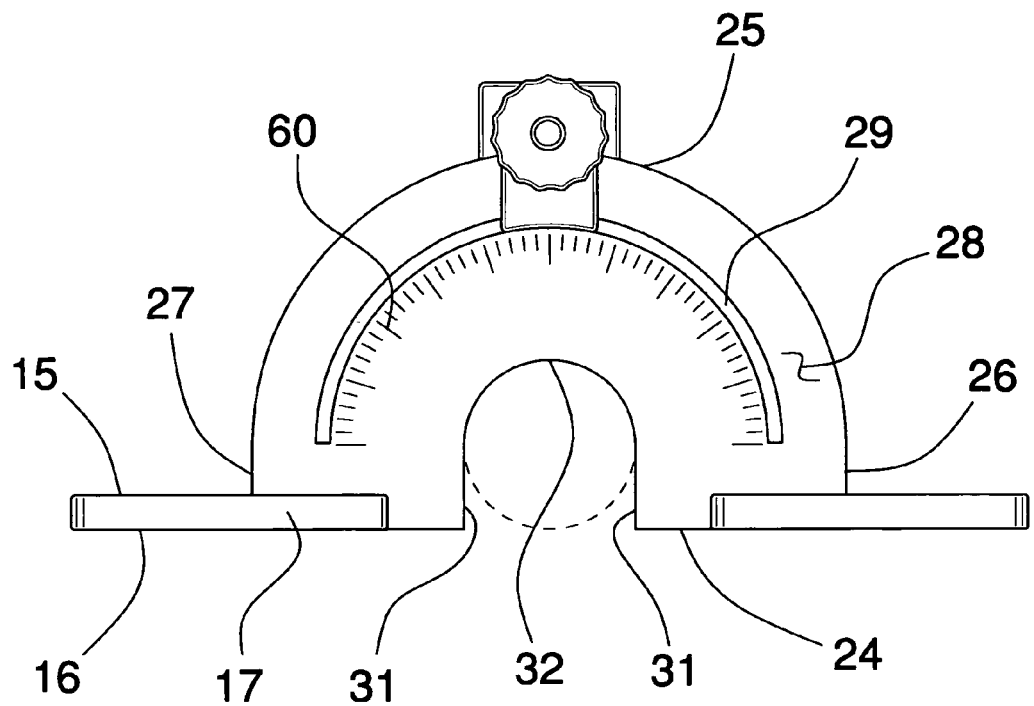
FIG. 2 is a front view of the present invention.
Figure 3:
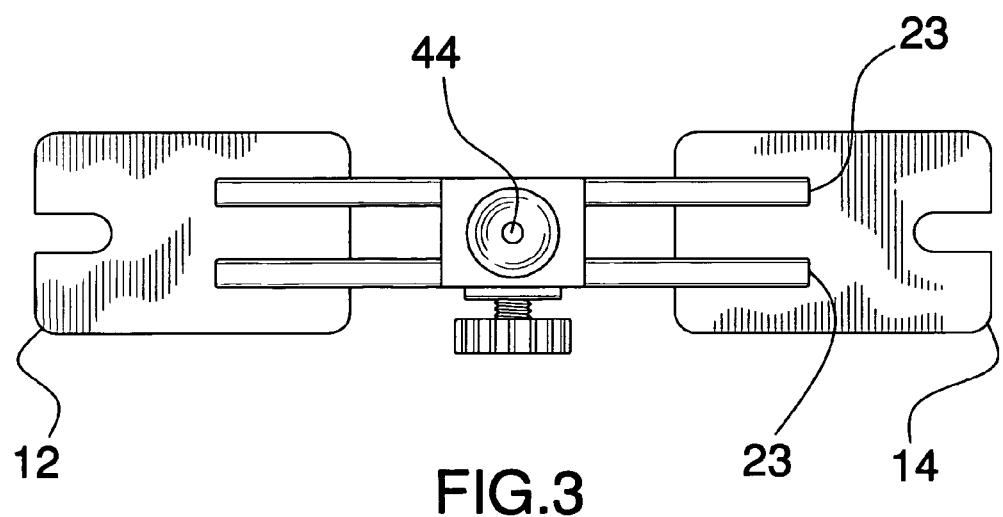
FIG. 3 is a top view of the present invention.

With reference now to the drawings, and in particular to FIGS. 1 through 5 thereof, a new drilling guide device embodying the principles and concepts of the present invention and generally designated by the reference numeral 10 will be described.

As best illustrated in FIGS. 1 through 5, the drilling guide assembly 10 generally includes a first plate 12 and a second plate 14. Each of the plates 12, 14 has a top side 15, a bottom side 16, and a peripheral edge 17. The peripheral edges 17 each have at least one slit 18 therein. When the first 12 and second 14 plates are part of the assembly 10 as will be shown below, it is preferred that at least one slit 18 in the first plate 12 is aligned with one slit 18 in the second plate 14 along a line bisecting each of the first 12 and second 14 plates.

A first panel 21 and a second panel 22 are each provided. Each of the first 21 and second 22 panels has a perimeter edge 23. The perimeter edges 23 each include a bottom edge 24, a top edge 25, a first side edge 26 and a second side edge 27. Each of the panels 21, 22 extends into and is attached to each of the first 12 and second 14 plates such that the first 12 and second 14 plates are spaced from each other and each of the first 21 and second 22 panels extends upwardly away from the top sides 15 of the first 12 and second 14 plates. The panels 21, 22 are spaced from each other a distance between 0.50 inches and 1.50 inches and the panels 21, 22 are each between 0.10 inches and 0.50 inches in thickness. The first 21 and second 22 panels lie in planes orientated substantially parallel to each other and the perimeter edges 23 of the first 21 and second 22 panels are substantially aligned with respect to each other. The top edges 25 of the first 21 and second 22 panels are arcuate.

Each of the bottom edges 24 is substantially flush with the bottom side 16 of the first 12 and second 14 plates. Each of the bottom edges 24 has a slot 30 therein. The slots 30 are each positioned between associated ones of the first 26 and second 27 side edges and between the first 12 and second 14 plates so that the slots 30 are aligned with each other. The slots 30 each have a bottom portion and an upper portion. The bottom portions have a pair of vertical sides 31 and each of the upper portions comprises a semicircular arc 32. The slots 30 each have a height equal to a diameter of the semicircular arc 32. Thus, when a pipe 6 having the same diameter of the semicircular arc 32 is positioned within the slots 30, the outer surface of the pipe 6 will abut the upper portions and will be flush with a plane of the bottom edges 24. This diameter is preferably between 0.75 inches and 3.0 inches and will vary depending on the size of the pipes 6 to be worked on. An axis of the semicircular arc 32 is co-axial with an arc of the top edges 25 of the first 21 and second 22 panels. The first panel 21 has an outer side 28 facing away from the second panel 22. The outer side 28 has an elongated notch 29 therein. The notch 29 is positioned generally adjacent to and extends along the top edge 25 of the first panel 21 so that the notch 29 has an arcuate shape as well.

A drill bit guide 40 has a lower section 41 and an upper section 42 integrally coupled together. The lower section 41 has a width substantially equal to a distance between the first 21 and second 22 panels. The upper section 42 has a width greater than the lower section 41 such that a flange 43 is defined at a juncture of the upper 42 and lower 41 sections. The flange 43 is positionable on the upper edges 25 of the first 21 and second 22 panels such that the lower section 41 is positioned between the first 21 and second 22 panels. The flange 43 has a concave lower side 48 conforming to the upper edges 25. The drill bit guide 40 has an aperture 44 extending therethrough. The aperture 44 extends into an upper surface 45 of the upper section 42 and outwardly of a lower surface 46 of the lower section 41. The drill bit guide 40 is comprised of a metallic material of sufficient strength to resist being worn by a drill bit and may include materials such as aluminum alloys, steel alloys and titanium alloys.

A clamp member 50 is attached to the upper section 42 and is adapted for attaching the drill bit guide 40 to the first panel 21 in such a manner that the drill bit guide 40 may be selectively positioned on the upper edges 25. The clamp member 50 includes a leg portion 51 and a foot portion 52 attached together at a substantially perpendicular angle with respect to each other. A fastener 53 extends through the leg portion 51 and into the drill bit guide 40 such that the leg portion 51 is biased toward to the outer surface 28 of the first panel 21 and the foot portion 52 extends into the elongated notch 29. The fastener 53 may include a threaded rod attached to an extending away from the drill bit guide 40. The threaded rod is extends through an opening 54 in the leg portion 51 and is releasably secured thereto with a threaded coupler 55.

In use, the plates 12, 14 may be secured to a worktable by extending bolts into the table and positioning the bolts in the slits 18. A pipe 6 may be selectively positioned in the slots 30. Once the drill bit guide 40 is positioned on the first 21 and second 22 panels, a longitudinal axis of the aperture 44 will be aligned with a cross-sectional axis of the pipe 6. A drill bit may be removably extended through the aperture and into the pipe 6 so that the drill bit engages the surface of the pipe 6 at 90 degrees regardless if the pipe 6 has a bend in it as shown in FIG. 1. The outer surface 28 of the first panel 21 preferably has angle marking indicia 60 thereon for indicating the angle at which a bore is being made in the pipe 6. The upper surface 45 of the drill bit guide preferably has a depression 49 therein which bounds the aperture 44. The depression 49 aids in positioning a drill bit into the aperture 44. The assembly 10 will be made with varying sizes of diameters for the semicircular arcs 32 so that the assembly 10 may accommodate different sized pipes. Additionally, the drill bit guide 40 will be furnished with a variety of different sized apertures 44 for accepting different sizes of drill bits.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An alignment device for aligning a drill bit with a pipe at a selected angle, said device comprising:
    a first plate and a second plate, each of said plates having a top side, a bottom side, and a peripheral edge;
    a first panel and a second panel, each of said first and second panels having a perimeter edge, each of said perimeter edges including a bottom edge, a top edge, a first side edge and a second side edge, each of said panels extending into and being attached to each of said first and second plates such that said first and second plates are spaced from each other and each of said first and second panels extends upwardly away from said top sides of said first and second plates, said perimeter edges of said first and second panels being aligned with respect to each other, each of said bottom edges having a slot therein positioned between associated ones of said first and second side edges;
    a drill bit guide having a lower section and an upper section integrally coupled together, said lower section having a width substantially equal to a distance between said first and second panels, said upper section having a width greater than said lower section such that a flange is defined at a juncture of said upper and lower sections, said flange being positioned on said upper edges of said first and second panels such that the lower section is positioned between said first and second panels, said drill bit guide having an aperture extending therethrough, said aperture extending into an upper surface of said upper section and outwardly of a lower surface of said lower section;
    a clamp member being attached to said upper section and being adapted for attaching said drill bit guide to said first panel such that said drill bit guide may be selectively positioned on said upper edges; and
    wherein a pipe may be selectively positioned in said slots such that a drill bit may be removably extended through said aperture and into the pipe.

2. The device according to claim 1, wherein said top edges are arcuate.

3. The device according to claim 2, wherein each of said slots has a bottom portion and an upper portion, each of said bottom portions having a pair of vertical sides, each of said upper portions comprising a semicircular arc, each of said slots having a height equal to a diameter of said semicircular arc.

4. The device according to claim 3, wherein an axis of said semicircular arc is co-axial with an arc of said top edges.

5. The device according to claim 4, wherein said first panel has an outer side facing away from said second panel, said outer side having an elongated notch therein, said notch being positioned generally adjacent to and extending along said top edge of said first panel, said clamp member including a leg portion and a foot portion attached together at a substantially perpendicular angle with respect to each other, a fastener extending through said leg portion and into said drill bit guide such that said leg portion is biased against said outer surface of said first panel and said foot portion extends into said elongated notch.

6. The device according to claim 2, wherein said first panel has an outer side facing away from said second panel, said outer side having an elongated notch therein, said notch being positioned generally adjacent to and extending along said top edge of said first panel, said clamp member including a leg portion and a foot portion attached together at a substantially perpendicular angle with respect to each other, a fastener extending through said leg portion and into said drill bit guide such that said leg portion is biased against said outer surface of said first panel and said foot portion extends into said elongated notch.

7. An alignment device for aligning a drill bit with a pipe at a selected angle, said device comprising:

a first plate and a second plate, each of said plates having a top side, a bottom side, and a peripheral edge, each of said peripheral edges having at least one slit therein;

a first panel and a second panel, each of said first and second panels having a perimeter edge, each of said perimeter edges including a bottom edge, a top edge, a first side edge and a second side edge, each of said panels extending into and being attached to each of said first and second plates such that said first and second plates are spaced from each other and each of said first and second panels extends upwardly away from said top sides of said first and second plates, said first and second panels lying in planes orientated substantially parallel to each other, said perimeter edges of said first and second panels being aligned with respect to each other, said top edges being arcuate, each of said bottom edges being substantially flush with said bottom side of said first and second plates, each of said bottom edges having a slot therein positioned between associated ones of said first and second side edges, each of said slots having a bottom portion and an upper portion, each of said bottom portions having a pair of vertical sides, each of said upper portions comprising a semicircular arc, each of said slots having a height equal to a diameter of said semicircular arc, said first panel having an outer side facing away from said second panel, said outer side having an elongated notch therein, said notch being positioned generally adjacent to and extending along said top edge of said first panel, an axis of said semicircular arc being co-axial with an arc of said top edges;

a drill bit guide having a lower section and an upper section integrally coupled together, said lower section having a width substantially equal to a distance between said first and second panels, said upper section having a width greater than said lower section such that a flange is defined at a juncture of said upper and lower sections, said flange being positioned on said upper edges of said first and second panels such that the lower section is positioned between said first and second panels, said flange having a concave lower side conforming to said upper edges, said drill bit guide having an aperture extending therethrough, said aperture extending into an upper surface of said upper section and outwardly of a lower surface of said lower section, said drill bit guide comprising a metallic material;

a clamp member being attached to said upper section and being adapted for attaching said drill bit guide to said first panel such that said drill bit guide may be selectively positioned on said upper edges, said clamp member including a leg portion and a foot portion attached together at a substantially perpendicular angle with respect to each other, a fastener extending through said leg portion and into said drill bit guide such that said leg portion is biased against said outer surface of said first panel and said foot portion extends into said elongated notch; and wherein a pipe may be selectively positioned in said slots such that a drill bit may be removably extended through said aperture and into the pipe.

\* \* \* \* \*